United States Patent [19]

Pollard

[11] Patent Number: 5,301,527
[45] Date of Patent: Apr. 12, 1994

[54] SECURITY DEVICE FOR A TRAILER

[76] Inventor: Marion F. Pollard, 12461 SW. 23rd Terr., Miami, Fla. 33175

[21] Appl. No.: 18,108

[22] Filed: Feb. 17, 1993

[51] Int. Cl.⁵ .......................................... B60R 25/00
[52] U.S. Cl. ....................................... 70/226; 70/232; 70/237; 188/32
[58] Field of Search .................. 70/18, 209, 225, 226, 70/232, 237, 259, 260; 188/32

[56] References Cited

U.S. PATENT DOCUMENTS

| | | | |
|---|---|---|---|
| 1,396,067 | 11/1921 | Setkowski | 70/225 |
| 1,881,567 | 10/1932 | Henke, Jr. | 70/232 |
| 3,534,570 | 10/1970 | Mauro | 70/230 |
| 3,713,668 | 1/1973 | Flindt | 70/226 X |
| 4,688,408 | 8/1987 | Shroyer | 70/226 |
| 4,819,462 | 4/1989 | Apsell | 70/226 X |
| 4,854,144 | 8/1989 | Davis | 70/226 |
| 4,878,366 | 11/1989 | Cox | 70/226 X |
| 4,888,969 | 12/1989 | Suroff | 70/226 |

FOREIGN PATENT DOCUMENTS

| | | | |
|---|---|---|---|
| 2520683 | 8/1983 | France | 70/226 |
| 2037242 | 7/1980 | United Kingdom | 70/226 |
| 2091182 | 7/1982 | United Kingdom | 70/226 |
| 2170765 | 8/1986 | United Kingdom | 70/237 |
| 2185454 | 7/1987 | United Kingdom | 70/237 |
| 2191983 | 12/1987 | United Kingdom | 70/237 |

*Primary Examiner*—Lloyd A. Gall
*Attorney, Agent, or Firm*—Malin, Haley, DiMaggio & Crosby

[57] ABSTRACT

A security device for a trailer wheel to prevent unauthorized trailer movement that can be quickly and easily employed or removed. The device includes elongated wheel lug adapters and a back plate which are mounted with conventional lug nuts to the trailer wheel. A security bar and cover can be quickly engaged to the back plate and locked in place or easily removed when the trailer is ready for use by a key actuated locking mechanism.

4 Claims, 2 Drawing Sheets

SECURITY DEVICE FOR A TRAILER

BACKGROUND OF THE INVENTION

1. Field of the Invention

This invention relates generally to a security apparatus that fastens to the wheel lugs or lug bolts of a vehicle wheel hub to prevent unauthorized movement of the vehicle, and in particular, to a lockable security device that attaches to one trailer wheel hub, either with the wheel lugs or bolts of the wheel hub, and that utilizes a rigid security bar that prevents rotation of the trailer wheel and therefore, unauthorized movement of the trailer. The primary use of the device is to stop the theft of a trailer, particularly a boat trailer or other utility trailer, while using a device that can be quickly engaged or disengaged.

2. Description of the Prior Art

In recent years, in most large cities, there have been increased crime problems, and in particular, vehicle theft, including parked, small utility trailers used for transporting boats parked thereon. Many types of security devices have been employed to attempt to protect utility trailers, especially carrying boats, from being stolen. Primarily, each trailer has two or four wheels and a tongue hitch and lock that prevents activation of the trailer hitch and prevents engagement into a trailer hitch ball that could be attached to a towing vehicle. Such hitch locks have proven ineffective in preventing the theft of trailers. Some devices have been utilized that attempt to make the wheels of the trailer inoperable to prevent movement of the trailer. One such device is shown in U.S. Pat. No. 4,819,462, issued to Agsell Apr. 11, 1989, which shows a locking clamp for a wheel. Although this device is used for preventing rotation of the wheel and includes a wheel chock thereon, the device is cumbersome in that it requires mounting on both the front and rear portions of the wheel. Therefore, such a device is time consuming and awkward to engage or disengage from the tire. U.S. Pat. No. 2,960,857, issued to Winter Nov. 22, 1960, shows another device to prevent trailer wheel rotation that must be engaged on both sides of the wheel (both inside and outside) and acts as a clamp mechanism, again being cumbersome, bulky, and time consuming for installation and removal.

One of the important aspects of the present invention is the short time period required to engage or disengage the security arm. For a small boat owner with a boat and trailer, the security arm can be fully removed from or fully engaged with the trailer wheel in a matter of seconds.

U.S. Pat. No. 4,888,969, issued to Suroff Dec. 26, 1989, shows a wheel locking device that utilizes a plurality of pivoted arms that includes multiple pieces that are engaged for locking the wheel.

U.S. Pat. No. 4,878,366, issued to Cox Nov. 7, 1989, shows another wheel attachment device that protrudes through onto the opposite side of the wheel and requires a plurality of parts that have to be maneuvered in order to disengage or attach the device to a wheel.

All of these devices discussed herein show time consuming, complex security devices that attach to wheels, particularly trailer wheels having conventional tires that use lug nuts or bolts to attach the tire and rim to an axle and wheel housing. The present invention provides for a sturdy, reliable device that can be conveniently removed or attached within seconds to a security housing already mounted on the wheel that does not have to be entirely removed to disengage the security feature. The invention saves time by allowing the security bar to be quickly removed or engaged, as desired.

SUMMARY OF THE INVENTION

A security device utilized with a vehicle wheel to prevent the unauthorized movement of the wheeled vehicle, such as a trailer, and specifically, a device to prevent rotation of a vehicle wheel and tire to prevent vehicular movement.

The purpose of the invention is to provide a trailer security device that is lockable and easily and quickly removed or engaged to the trailer wheel.

The security device in accordance with the present invention includes three separate components. The first component is a back plate, adapter array that is installably attached to the trailer wheel hub and need only be removed to change the tire or to remove the wheel of the device. This security component is attached by conventional lug nuts and includes lug nut adapters and a back plate, all of which are attached to the wheel hub, holding the wheel on threadably.

The second essential component is a security bar, which is an elongated rigid bar that attaches to the back plate quickly and easily. The third component is a cover that allows the lug nuts to be covered with the security bar attached to the back plate in place and includes a key actuated locking mechanism.

The security device in accordance with the present invention includes the back plate that affixes to a conventional vehicle wheel hub that typically uses conventional lug nuts or hub attaching bolts, with a plurality of elongated lug adapters in conjunction with a rigid, elongated security bar that can be quickly lockably attached or removed from the back plate by removal of a cover by a lock and key mechanism, the security bar being long enough to prevent rotation of the vehicle wheel when in the locked position.

The back plate is attached to one wheel hub by a plurality of elongated, rigid metal threaded adapters which attach at one end, for example, to the conventional lugs, which are attached to the wheel hub and axle of a trailer wheel. One end of the adapter includes a socket or female end that includes threads that fit over the wheel lugs, with the adaptor opposite ends providing threaded end tips which themselves act as lugs for the wheel lug nuts to attach the back plate. The number of adapters used is equal to the number of lugs on the particular wheel, which typically maybe either five or four.

The rigid metal back plate has two sets of apertures completely therethrough the first set of which includes a sufficient number of properly spaced apertures equal to the number of wheel lugs on the wheel hub so that the rigid back plate can be alignably mounted on the threaded end portions of the adapters. The back plate has a second set of apertures, comprising two apertures next to the back plate stud to receive studs in the security bar.

The back plate also includes a threaded elongated center stud that is placed through a hole in an elongated security bar that prevents wheel rotation in that when locked in place, the end of the bar extends beyond the wheel circumference (radially).

Two non-threaded studs on the security bar align and fit into the back plate when the security bar is mounted onto the back plate stud. In addition, the wheel lug nuts are attached to the adapters, holding the back plate firmly in place. Finally, the device includes a removable cover that prevents removal of the security bar and hides and prevents contact with the lug nuts fastened to the back plate. The cover has a lock and key mechanism so that the cover can be removably locked securely over the back plate, covering the lug nuts' access to the security bar.

Thus, the back plate and adapter array can be left on the wheel at all times (unless wheel removal is required) in conjunction with the lug nuts that threadably attach the back plate to the adapters, which themselves are affixed to the lug nuts of the wheel. The security bar and the lockable cover can quickly be employed or removed from the back plate as desired to change the mode of operation between transport and security.

It is an object of this invention to provide an improved security device for a wheeled vehicle, such as a trailer, to prevent unauthorized movement of the trailer when desired.

It is another object of the invention to provide a security device for a wheeled vehicle to prevent unauthorized movement that can be quickly activated or removed with the use of a key locking system.

And yet still another object of the invention is to provide a security device for a trailer that is non-complex to install and economical.

In accordance with these and other objects which will be apparent hereinafter, the instant invention will now become described with particular reference to the accompanying drawings.

DESCRIPTION OF THE PREFERRED EMBODIMENTS

Figure 1:
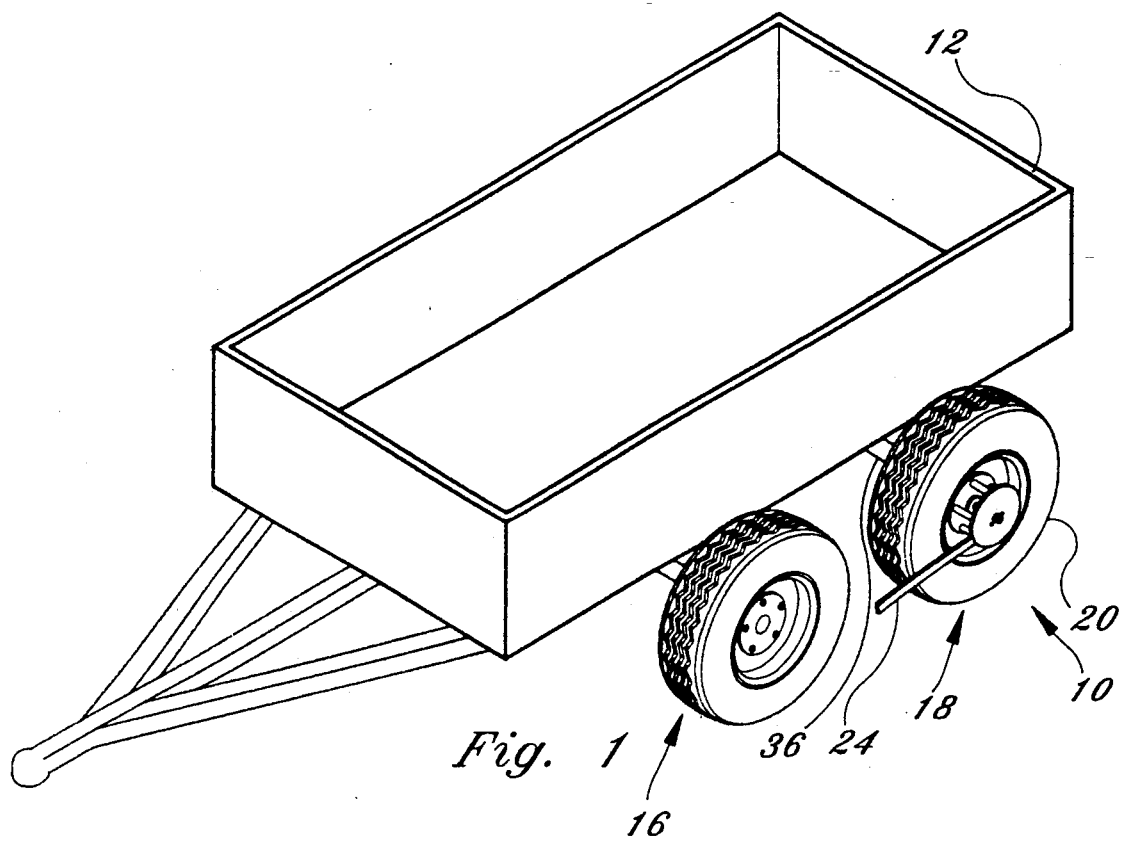
FIG. 1 shows a perspective view of a trailer that includes the invention installed on one of the wheels of the trailer.

Referring now to FIG. 1, the present invention is shown generally at 10, attached to a trailer 12, having wheels 16 and 18 mounted on separate axles.

Figure 2:
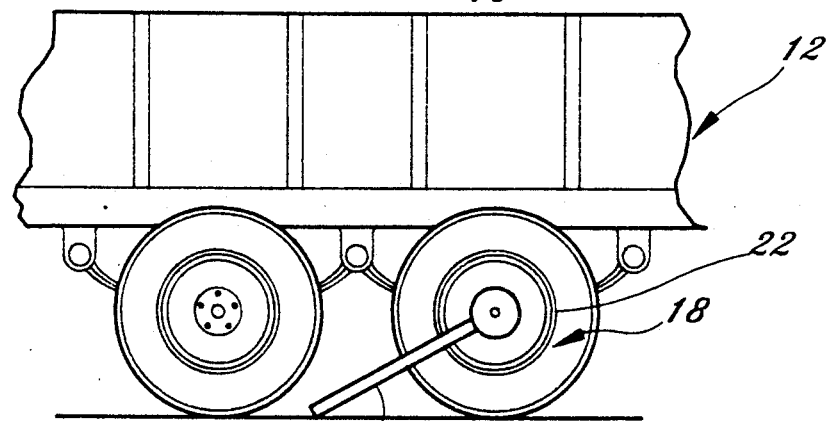
FIG. 2 shows a side elevational view of the invention with the trailer partially cut away and the invention installed on one of the trailer wheels.

FIG. 2 shows the invention 10 engaged to wheel rim 18 and 22, with the security bar 24 contacting the ground at its free end. Note that because of the elongated length of bar 24, which is greater than the radius of tire 20, the trailer 12 cannot be effectively moved for any distance, except as permitted by rotation of bar 24.

Figure 3:
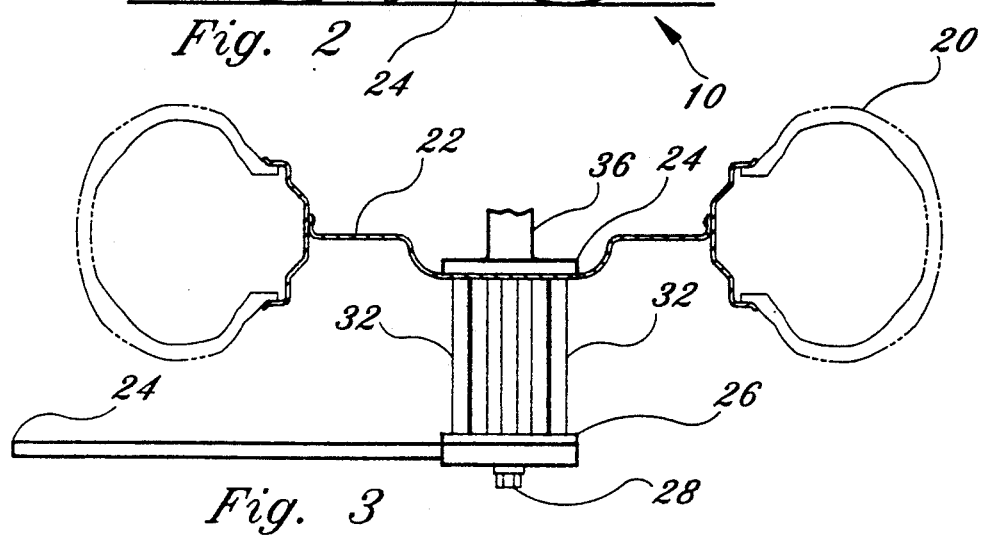
FIG. 3 shows a top plan view of the invention as installed on a wheel shown in phantom.

FIG. 3 shows the invention 10 attached to wheel hub 34 which is rigidly affixed to trailer axle 36, both of which are conventional. A plurality of elongated adapters 32, in conjunction with a circular back plate 30 and lug nuts (not visible in FIG. 3), form a security housing, which is threadably attached to the rim 22 and wheel hub 34. The removable portions of the device include the lug nut cover 26 and the security bar 24. FIG. 3 also shows the security lock 28 which holds and locks removably the cover 26 in position as well as the security bar 24.

Figure 4:
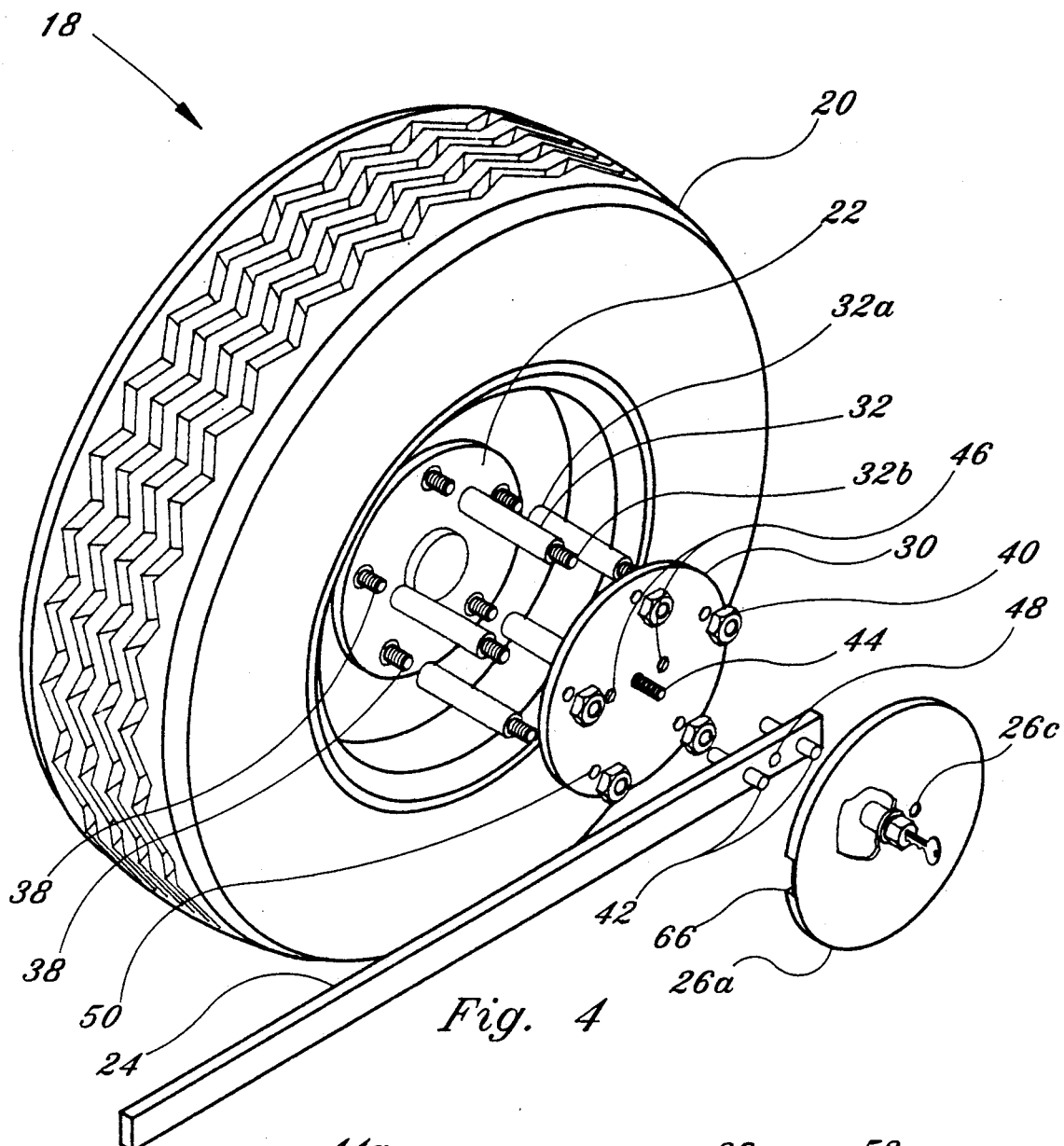
FIG. 4 shows an exploded view, in perspective, of the invention as it would be installed on a trailer wheel.

Referring now to FIG. 4, an exploded view of the invention is shown. The device includes an array or plurality of adapters 32 threadably attached to wheel hub lugs 38 which are affixed to the wheel hub 34, each adapter 32 having a hollow threaded female end 32a which is sized to rotationally fit threadably to lug 38 at one end. One adapter 32 is used with each wheel lug 38. The opposite end of each adapter 32 includes its own threaded stud 32b that is sized to fit to receive conventional wheel lug nuts 40. The wheel lug nuts 40 threadably rotatably engage the adapter stud ends 32b and firmly secure back plate 30 together with the adapters 32 after they already have been threadably attached to the trailer wheel hub 34 and the wheel lugs 38. The back plate 30, the adapters 32, and lug nuts 40 once installed remain in position, whether the security arm 24 is in use (attached) or removed and the trailer is in use in a transport mode. The back plate and adapter array need only be removed if the wheel 18 need be removed.

In the security mode of operation, the rigid removable security bar 24 is used to prevent the rotation of wheel 18 and is manually mounted onto the back plate stud 44 and two back plate apertures 46, each which slidably receives a security bar mounting stud 42 having no threads. The back plate stud 44 fits and slides through security bar aperture 48. The studs 42 engage in back plate apertures 46 and prevent relative motion between back plate 30 and bar 24. The studs 42 are rigidly attached to security rod 24 near one end adjacent aperture 48. The security arm 24 will move in conjunction with any rotational movement of back plate 30. The security bar 24 is firmly held in place by cover 26 and a threaded lock 28 which engages the threaded portion of threaded stud 44 secured to back plate 30 to firmly lock cover 26 to back plate 30 and to security bar 24. The cover 26 hides and shields lug nuts 40 from being visible or removed to prevent removal of back plate 30. A key 52 is used to engage and disengage the locking mechanism 28 which attaches to the threaded stud 44. The key housing 28 will freely rotate when the key is removed. The cover 26 includes a peripheral lip 26a that surrounds the cover rim at least the depth thickness of the lug nuts, preventing access to the lug nuts. A slot opening 26b in cover 26 allows the security bar 24 to protrude. Also, the studs 42 extend from the front and back of bar 24 and engage apertures 26c in cover 26.

Figure 5:
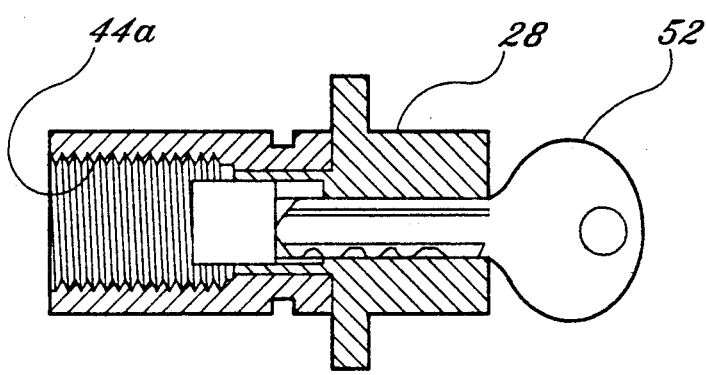
FIG. 5 shows a side elevational view partially in cross section of a locking mechanism.

FIG. 5 shows a typical conventional threaded locking mechanism that includes a lock housing 28 and key 52 which rotatably engage or disengage threaded socket 44a, allowing the threaded socket to be threadably attached to the threaded male stud 44 shown in FIG. 4 when the key is engaged and with the key removed, causing the locking mechanism 28 to rotate freely relative to the threaded socket 44a, making it impossible to disengage the locking mechanism and therefore, the cover 26, from back plate 30. The locking mechanism is similar to stud lug nut locking systems where the wheel can be locked through the stud itself. In this case, however, the locking mechanism itself is mounted within an aperture in the center of cover 26 so that it cannot be slidably pulled away from the cover 26.

In the locked position with the security bar 24 firmly attached to back plate 30 through apertures 46 with studs 42 and threaded stud 44 and the cover 26 firmly locked in placed by lock socket 44a attached to stud 44, wheel 18, if rotated, will also cause the adapters and the back plate to rotate, causing bar 24 to commence to rotate until the bar strikes the ground. Once this happens, the wheel 18 cannot rotate because of the length of rod 24, preventing unauthorized movement of the trailer.

In order to disengage the security bar 24, key 52 is used to engage lock 28 which allows rotation of socket 44a and disengages the cover from threaded stud 44, allowing the cover to be removed. At approximately the same time, once disengaged, the security bar can be pulled backwards so that the studs 42 are disengaged from backplate apertures 46 and threaded stud 44 is disengaged from security bar aperture 48 allowing the security bar 24 to be quickly and easily disengaged from the device. The cover can be locked in place for transit without the bar 24. With that simple series of disengagement procedures, the trailer is ready to be used for normal transit.

In order to engage the security bar 24, the bar 24 is placed on stud 44 through aperture 48 and studs 42 protruding outwardly from the back of bar 24 into apertures 46. The cover 26 is then quickly placed over back plate 30 and key 52 utilized to rotatably attach socket 44a to stud 44. The key 52 is then removed.

With the use of the present invention, any type of trailer or wheeled vehicle having lugs or lug bolts can be quickly and easily engaged or disengaged so that time is not wasted installing or removing the trailer security device.

The security device can be used with either conventional lugs having lug nuts or lug bolts by merely reversing the adapters as shown in FIG. 4.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A security device to prevent unauthorized movement of a wheeled vehicle such as a trailer, said trailer including removable wheels, each having a hub, a predetermined wheel radius, a wheel circumferential perimeter, and a plurality of wheel lug connectors, said security device comprising:
    a plurality of elongated, rigid adapters having a means for connecting each adapter longitudinally to said wheel lug connectors, said adapters including connecting means disposed at both ends;
    a rigid plate having apertures sized for mounting on said end connecting means on said adapters and a threaded stud affixed centrally thereto on one side;
    means for attaching said plate to said adapters;
    a rigid, elongated bar, longer than said trailer wheel radius, having at one end a means for attaching said bar to said plate, disposed radially relative to said wheel hub and having an end extending beyond said wheel circumferential perimeter;
    means for covering said plate, said covering means including a means for locking said covering means to said plate;
    said security device having two modes of operation and in a first mode, said security bar being removed for normal transport of said trailer, and in the security mode, said security bar and said covering means being locked to said plate, preventing rotation of the wheel;
    said covering means includes a circular plate having an elongated annular lip to prevent access to said means for attaching said plate to aid adapters, including a key-actuated lock disposed approximately in a central position of said covering means and a key for actuating said lock, said lock being attachable to said rigid plate threaded stud.

2. A security device as in claim 1, including:
    said security bar including a plurality of rigid studs disposed at one end, said studs sized for engagement with said plate and slidably disposable through said plate, to prevent rotation between said bar and said plate when said security bar studs are engaged with said plate whereby the security bar can be easily removed from said plate or easily attached to said plate in the secured mode position.

3. A security device as in claim 1, wherein:
    said adapters include elongated, cylindrical, rigid members having a female threaded end at one end and a male threaded lug at the opposite end, said adapters sized for attachment to conventional lugs from a trailer wheel at one end and sized at the other end to receive conventional lug nuts for attaching said plate to said adapters.

4. A security device as in claim 1, wherein:
    said adapters can be used with lug bolts for attaching said adapters to said trailer wheel and to said plate.

* * * * *